US012660825B2

(12) United States Patent
Jeong et al.

(10) Patent No.: US 12,660,825 B2
(45) Date of Patent: Jun. 23, 2026

(54) ANTIMICROBIAL POLYMER COATING COMPOSITION AND ANTIMICROBIAL POLYMER FILM

(71) Applicants: LG CHEM, LTD., Seoul (KR); YONSEI UNIVERSITY, UNIVERSITY - INDUSTRY FOUNDATION (UIF), Seoul (KR)

(72) Inventors: Hyeok Jeong, Daejeon (KR); Yong Rok Kim, Seoul (KR); Kang-Kyun Wang, Incheon (KR); Jinkyu Lee, Daejeon (KR); Mingoo Kim, Daejeon (KR)

(73) Assignees: LG CHEM, LTD., Seoul (KR); YONSEI UNIVERSITY, UNIVERSITY—INDUSTRY FOUNDATION (UIF), Seoul (KR)

( * ) Notice: Subject to any disclaimer, the term of this patent is extended or adjusted under 35 U.S.C. 154(b) by 253 days.

(21) Appl. No.: 16/493,783

(22) PCT Filed: Oct. 10, 2018

(86) PCT No.: PCT/KR2018/011895
§ 371 (c)(1),
(2) Date: Sep. 13, 2019

(87) PCT Pub. No.: WO2019/074270
PCT Pub. Date: Apr. 18, 2019

(65) Prior Publication Data
US 2020/0085057 A1      Mar. 19, 2020

(30) Foreign Application Priority Data
Oct. 11, 2017    (KR) ........................ 10-2017-0131520

(51) Int. Cl.
A01N 43/90      (2006.01)
A01N 25/10      (2006.01)
(52) U.S. Cl.
CPC ............. A01N 43/90 (2013.01); A01N 25/10 (2013.01)
(58) Field of Classification Search
CPC .......... C09D 4/00; C09D 175/16; C09D 5/14; C09D 175/14; C08F 222/1065; C08G 18/42; C08G 18/44; C08G 18/4615; C08G 18/8116; C08K 5/0058; C08K 5/3415; C08J 2375/14; C08J 5/18; C08J 7/04; C08J 2475/14; C08L 75/14
See application file for complete search history.

(56) References Cited

U.S. PATENT DOCUMENTS 4,921,589 A      5/1990    Yates et al.
8,901,244 B2 *  12/2014   Pajerski ............. C08G 18/6659
                                                    524/839

2010/0016208 A1    1/2010   Hasan et al.
2010/0135949 A1    6/2010   Ou-Yang
2010/0136209 A1    6/2010   Ou-Yang et al.
2010/0137379 A1    6/2010   Ou-Yang
2010/0137472 A1    6/2010   Ou-Yang
2011/0134554 A1    6/2011   Matsumoto et al.
2013/0330387 A1   12/2013   Ou-Yang
2016/0017169 A1    1/2016   Kostromine et al.
2016/0304742 A1 * 10/2016   Klang .................. C09D 175/06

FOREIGN PATENT DOCUMENTS

| CN | 102234480 A | 11/2011 |
| CN | 103396689 A | 11/2013 |
| CN | 104955910 A | 9/2015 |
| CN | 106189805 A | 12/2016 |
| JP | H09-226068 A | 9/1997 |
| JP | 2701230 B2 | 1/1998 |
| JP | 2012-510559 A | 5/2012 |
| KR | 10-1009997 B1 | 1/2011 |
| KR | 10-2011-0017180 A | 2/2011 |
| KR | 10-1335026 B1 | 12/2013 |
| KR | 10-2014-0080863 A | 7/2014 |
| KR | 10-1465964 B1 | 11/2014 |
| KR | 10-1646284 B1 | 8/2016 |
| KR | 10-1691679 B1 | 12/2016 |

OTHER PUBLICATIONS

Wainwright et al. (Journal of Photochemistry and Photobiology B: Biology 84 (2006) 227-230) (Year: 2006).*
Of Wainwright et al. (Journal of Photochemistry and Photobiology B: Biology 84 (2006) 227-230) (Year: 2006).*
Cho et al. (Journal of Applied Polymer Science, vol. 93, 1473-1483 2004) (Year: 2004).*
Jama (Honors Thesis: Effectiveness of a Novel Porphyrin Exhibiting Dark Toxicity Against the Model Organism *Mycobacterium smegmatis* Apr. 2017) (Year: 2017).*
Foote et al. (Active Oxygen in Chemistry chapter 4 Properties and Reactions of Singlet Dioxygen pp. 106 and 107 including Table 4-1 1995) (Year: 1995).*
Wasserman et al. (Singlet Oxygen p. 1 (Encyclopedia of Reagents for Organic Synthesis 2013) (Year: 2013).*
Extended Search Report Issue for European Patent Application No. 18866950.1 on Mar. 19, 2020, 6 pages.

(Continued)

*Primary Examiner* — Ali Soroush
*Assistant Examiner* — Afua Bamfoaa Boateng
(74) *Attorney, Agent, or Firm* — ROTHWELL, FIGG, ERNST & MANBECK, P.C.

(57) ABSTRACT

The present invention relates to an antimicrobial polymer coating composition comprising: a urethane acrylate-based oligomer or polymer having a molar ratio of a urethane functional group to a (meth)acrylate-based functional group of 1 to 10; a photosensitizer; and a photoinitiator; an antimicrobial polymer film comprising a cured product of the antimicrobial polymer coating composition; and an antimicrobial polymer film comprising a predetermined urethane acrylate-based polymer resin; and a photosensitizer dispersed in the polymer resin, wherein the polymer film has oxygen permeability of 5 to 100 cc/m$^2$ day.

9 Claims, 2 Drawing Sheets

(56)               References Cited

OTHER PUBLICATIONS

Wainwright et al., "Phenothiazinium-based photobactericidal materials" Journal of Photochemistry and Photobiology B: Biology, vol. 84, No. 3, May 18, 2006, pp. 227-230.

Cho et al., "UV_Initiated Free Radical and Cationic Photopolymerizations of Acrylate/Epoxide and Acrylate/Vinyl Ether Hybrid Systems with and without Photosensitizer", Journal of Applied Polymer Science, vol. 93, No. 3, Aug. 5, 2004, pp. 1473-1483.

PCT Search Report & Written Opinion issued for PCT Application No. PCT/KR2018/011895 on Jan. 30, 2019, 12 pages.

Jeon, G. et al., "Preparation and Characterization of UV-cured Polyurethane Acrylate/ZnO Nanocomposite Films", Appl. Chem. Eng., Dec. 2011, vol. 22, No. 6, pp. 610-616.

Mills, A., et al., "An overview of semiconductor photocatalysis", Journal of Photochemistry and Photobiology A: Chemistry 108 (1997) 1-35.

Wang, K-K., et al., "Bactericidal effect through non-uptake pathway with photofunctional silicon polymer that generates reactive oxygen species", Journal of Photochemistry and Photobiology A. Chemistry 315, 2016, 52-58.

Hong, K-H., et al., "Photoactive Antimicrobial Agents/Polyurethane Finished Leather", Journal of Applied Polymer Science, vol. 115, 2009, pp. 1138-1144.

Qunzhen Sun, et al., Study on Application of Hydroxy-Terminated Polybutadiene Telechelic Polymers synthesized by Double Lithium Catalyst, New Chemical Materials, 1995, No. 10, pp. 15-18, with partial English translation (total 5 pages).

* cited by examiner

[FIG. 1]
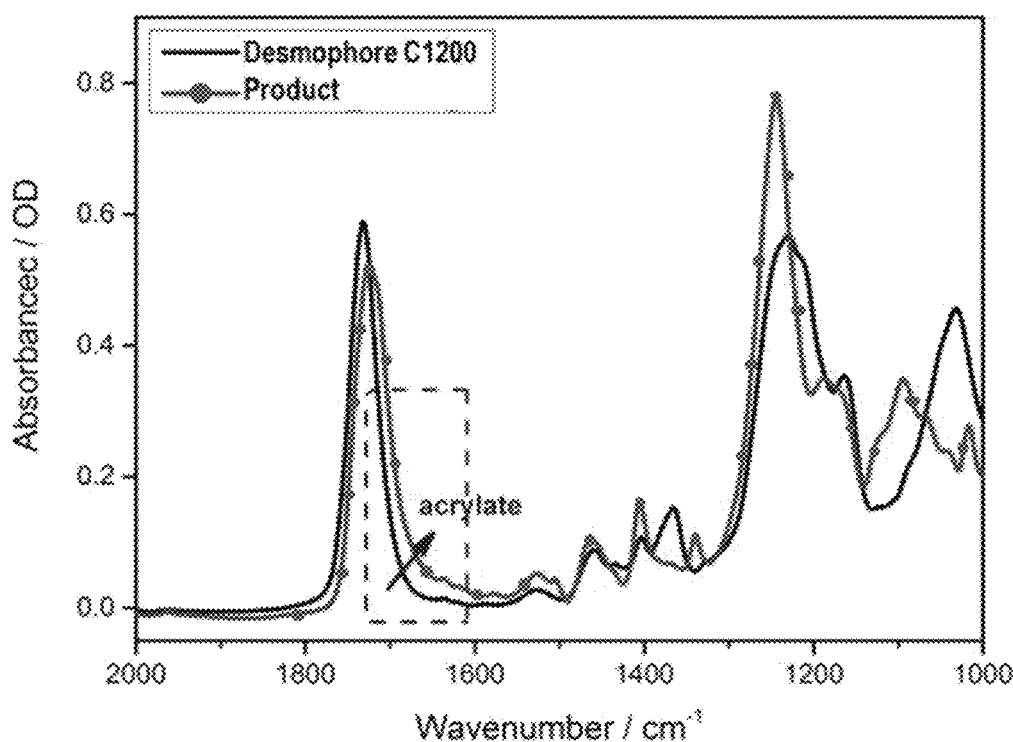
[FIG. 2]
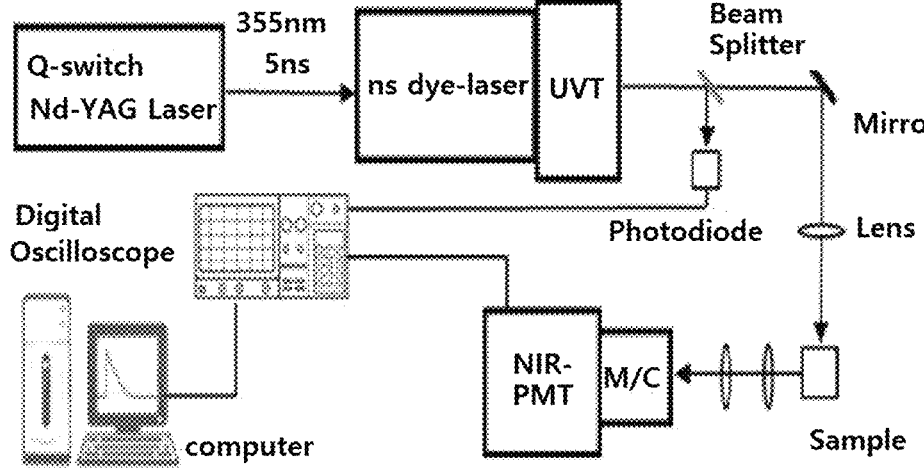

[FIG. 3]

Sample

Washing
(37 °C, 24h)

Efflux check

Fix the turbidity to 0.6
to quantitatively adjust
the amount of bacteria

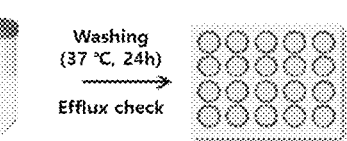

Dispense each
bacterium
in a well-plate

3mW/㎠
Green LED

Light
irradiation
(8 h)

1) w/ light
2) w/o light

Plate each sample of the
formed biofilm in blood
agar in triplicate
(7 types of samples x 3 ea)

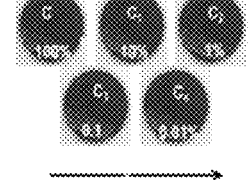

Dilute one sample into five types and
plating it up to C0~C4
(100 %, 10 %, 1 %, 0.1 %, 0.01 %),
Perform incubation for 24 h after plating.

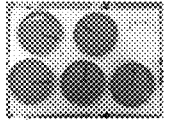

GLED Irradiated sample (8 h)

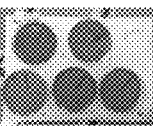

GLED Non-irradiated sample (8 h)

ANTIMICROBIAL POLYMER COATING COMPOSITION AND ANTIMICROBIAL POLYMER FILM

CROSS-REFERENCE TO RELATED APPLICATION(S)

This application is a 35 U.S.C. 371 National Phase Entry Application from PCT/KR2018/011895, filed Oct. 10, 2018, which claims the benefit of the filing date of Korean Patent Application No. 10-2017-0131520 filed with the Korean Intellectual Property Office on Oct. 11, 2017, the entire content of which is incorporated herein by reference.

TECHNICAL FIELD

The present invention relates to an antimicrobial polymer coating composition and an antimicrobial polymer film.

BACKGROUND ART

A photosensitizer absorbs light to produce reactive oxygen species (ROS), and a photodynamic therapy (PDT) is widely used in which the photosensitizer is excited upon irradiation with light of a specific wavelength from the outside to generate active oxygen species or free radicals, thereby inducing apoptosis of various lesions or cancer cells and destroying them.

Various attempts have been made to develop polymeric materials having antimicrobial activity using such photodynamic reaction. For example, a method of melting a silicone resin or the like and then mixing the melted resin with a photosensitizer, or a method of using a coating solution formed by dissolving a silicone resin and a photosensitizer in a solvent is known.

However, according to the method of melting a silicone resin or the like and mixing it with a photosensitizer, since the dispersibility between the photosensitizer and the silicone resin is low, the photosensitizer in the silicone resin can be aggregated without being homogeneously distributed.

In addition, when melted with the silicone resin, since it is impossible to adjust the thickness of the silicon after melting, there is a limitation in that it is not easy to produce products in accordance with the application fields and uses or it is not suitable for mass production.

Moreover, when a coating solution formed by dissolving a silicone resin and a photosensitizer in a solvent is used, it is known that a certain level of antimicrobial activity can be achieved without being severely limited in the field of application. However, it is not easy to produce active oxygen to such an extent that sufficient antimicrobial activity can be exhibited when light in the visible light region is used, and the produced active oxygen is present only for a very short period of time. Thus, there is a limitation in that an excessive amount of light energy must be irradiated for a relatively long period of time.

DETAILED DESCRIPTION OF THE INVENTION

Technical Problem

The present invention provides a photocurable antimicrobial coating composition which can maintain high antimicrobial activity for a long period of time even when using light in a visible light region, and can provide an antimicrobial material suitable for a mass production process.

The present invention provides an antimicrobial coating film which can maintain high antimicrobial activity for a long period of time even when using light in a visible light region.

Technical Solution

The present invention provides an antimicrobial polymer coating composition comprising: a urethane acrylate-based oligomer or polymer having a molar ratio of a urethane functional group to a (meth)acrylate-based functional group of 1 to 10; a photosensitizer; and a photoinitiator.

The present invention also provides an antimicrobial polymer film comprising a cured product of the antimicrobial polymer coating composition.

In addition, the present invention provides an antimicrobial polymer film comprising: a substrate layer containing a urethane acrylate-based polymer resin having a molar ratio of a urethane functional group to a (meth)acrylate-based functional group of 1 to 10; and a photosensitizer dispersed in the substrate layer, wherein the polymer film has oxygen permeability of 5 to 100 $cc/m^2$ day.

Hereinafter, the antimicrobial polymer coating composition and the antimicrobial polymer film according to a specific embodiment of the present invention will be described in more detail.

In the present invention, the term "(meth)acrylate" is used with the meaning of including acrylate or methacrylate.

According to one embodiment of the invention, an antimicrobial polymer coating composition can be provided, comprising: a urethane acrylate-based oligomer or polymer having a molar ratio of a urethane functional group to a (meth)acrylate-based functional group of 1 to 10; a photosensitizer; and a photoinitiator.

The present inventors conducted research on materials having a functional property such as antimicrobial activity using a photosensitizer, and found through experiments that a photocurable coating composition produced by mixing urethane acrylate-based oligomer or polymer having a molar ratio of a urethane functional group to a (meth)acrylate-based functional group of 1 to 10 with a photosensitizer not only is easily applicable to various fields and is suitable for mass production, but can also realize high antimicrobial activity even when applying light in a visible light region during production of an actual coating film or a coated molded article, and particularly, the generated active oxygen remains for a long time compared to previously known antimicrobial materials and thus can achieve high antimicrobial efficiency. The present invention has been completed on the basis of such findings.

More specifically, as the molar ratio of the urethane functional group to the (meth)acrylate-based functional group in the urethane acrylate-based oligomer or polymer is limited to 1 to 10, or 4 to 8, a predetermined polymer structure may be formed inside a polymer film or a polymer molded article produced using the urethane acrylate-based oligomer or polymer. Accordingly, the polymer film or the polymer molded article may have specific air permeability, for example, oxygen permeability, of 5 to 100 $cc/m^2$ day, 20 to 90 $cc/cc/m^2$ day, or 25 to 80 $cc/m^2$ day.

When light in a visible light region is irradiated to such a polymer film or a polymer molded article, active oxygen species or free radicals are generated from the photosensitizer contained in the polymer film or the polymer molded article. As described above, as the polymer film or the polymer molded article has oxygen permeability in the above-described range, the active oxygen can be generated more efficiently, and also the time during which the active oxygen remains can be greatly increased.

When the molar ratio of the urethane functional group to the (meth)acrylate-based functional group in the urethane acrylate-based oligomer or polymer is too small, the oxygen permeability of the polymer film or the polymer molded article produced from the polymer coating composition is significantly lowered, and active oxygen is not sufficiently generated during visible light irradiation, and antimicrobial activity is not realized, so that it may be difficult to apply to a plurality of application products.

When the molar ratio of the urethane functional group to the (meth)acrylate-based functional group in the urethane acrylate-based oligomer or polymer is too large, active oxygen may be generated at a certain level during visible light irradiation, but the film strength of the polymer film is lowered so that a slight amount of the supported photosensitizer may leak out of the film, and a secondary side reaction with the leaked photosensitizer (for example, harmful effects on the human body due to the photosensitizer, environmental pollution, etc.) may occur. In addition, since the polymer film has low hardness, it may be difficult to apply it to a plurality of application products.

The urethane acrylate-based oligomer or polymer may have a predetermined molecular weight in consideration of the specific use and physical properties of the antimicrobial coating composition. For example, the urethane acrylate-based oligomer or polymer may have a weight average molecular weight of 200 g/mol to 50,000 g/mol.

As used herein, the weight average molecular weight means a weight average molecular weight in terms of polystyrene measured by the GPC method.

As described above, when the antimicrobial polymer coating composition is irradiated with light in a visible ray region after photocuring, the photosensitizer may be excited to generate active oxygen or the like. For this purpose, the antimicrobial polymer coating composition may contain a photosensitizer in a predetermined amount.

Specifically, the antimicrobial polymer coating composition may include 0.01 to 5 parts by weight of the photosensitizer relative to 100 parts by weight of the urethane acrylate-based oligomer or polymer having a molar ratio of a urethane functional group to a (meth)acrylate-based functional group of 1 to 10.

Meanwhile, as the photosensitizer, a commonly known compound may be used. For example, porphine compounds, porphyrin compounds, chlorin compounds, bacteriochlorin compounds, phthalocyanine compounds, naphthalocyanine compounds, 5-aminoevuline esters, or combinations of two or more thereof may be used.

However, in order to achieve higher antimicrobial activity and antimicrobial activity-maintaining performance in the final product prepared from the antimicrobial polymer coating composition, it is preferable to use a porphine compound or a porphyrin compound. More preferably, as the photosensitizer, a porphine compound or a porphyrin compound in which 1 to 8 phenyl groups introduced with an alkoxy having 1 to 10 carbon atoms are introduced such as 5,10,15,20-tetrakis(4-methoxyphenyl)-porphine can be used.

The antimicrobial polymer coating composition may contain a photoinitiator in a predetermined amount.

Specifically, the antimicrobial polymer coating composition may include 0.001 to 10 parts by weight of the photoinitiator relative to 100 parts by weight of the urethane acrylate-based oligomer or polymer having a molar ratio of the urethane functional group to the (meth)acrylate-based functional group of 1 to 10.

Specific examples of the photoinitiator are not limited, and commonly known photo initiators can be used without particular limitation.

Specific examples of the photoinitiator include benzophenone-based compounds, acetophenone-based compounds, non-imidazole-based compounds, triazine-based compounds, oxime-based compounds, or mixtures of two or more thereof.

The antimicrobial polymer coating composition may further include an organic solvent or a surfactant.

The organic solvent may be added at the time of mixing the respective components contained in the antimicrobial polymer coating composition, or may be contained in the antimicrobial polymer coating composition while the respective components being added in a state of being dispersed in or mixed with the organic solvent.

For example, the antimicrobial polymer coating composition may include an organic solvent such that the total solid content concentration of the components contained therein is 1 wt % to 80 wt %, or 2 to 50 wt %.

Non-limiting examples of the organic solvent include ketones, alcohols, acetates, and ethers, or mixtures of two or more thereof.

Specific examples of the organic solvent include ketones such as methyl ethyl ketone, methyl isobutyl ketone, acetylacetone, and isobutyl ketone; alcohols such as methanol, ethanol, n-propanol, i-propanol, n-butanol, i-butanol, and t-butanol; acetates such as ethyl acetate, i-propyl acetate, and polyethylene glycol monomethyl ether acetate; ethers such as tetrahydrofuran and propylene glycol monomethyl ether; or mixtures of two or more thereof.

The type of the surfactant is also not particularly limited, and an anionic surfactant, a cationic surfactant, an amphoteric surfactant, a nonionic surfactant, and the like can be used.

The antimicrobial polymer coating composition may contain 0.001 to 20 parts by weight of the surfactant relative to 100 parts by weight of the urethane acrylate-based oligomer or polymer having a molar ratio of the urethane functional group to the (meth)acrylate-based functional group of 1 to 10.

Meanwhile, the antimicrobial polymer coating composition may, optionally, further include a monomer or oligomer having a monofunctional or polyfunctional functional group, in addition to the urethane acrylate-based oligomer or polymer having a molar ratio of the urethane functional group to the (meth)acrylate-based functional group of 1 to 10.

Specifically, the antimicrobial polymer coating composition may include a monomer or an oligomer containing a (meth)acrylate or a vinyl group.

Specifically, the photopolymerizable compound may include a monomer or an oligomer containing one or more, two or more, or three or more of (meth)acrylates or vinyl groups.

Specific examples of the monomer or oligomer containing the (meth)acrylate include pentaerythritol tri(meth)acrylate, pentaerythritol tetra(meth)acrylate, dipentaerythritol penta (meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri (meth)acrylate, trimethylolpropane trimethacrylate, ethylene glycol dimethacrylate, butanediol dimethacrylate, hexaethyl methacrylate, butyl methacrylate, or a mixture of two or more thereof, or alternatively an epoxide acrylate oligomer, an ether acrylate oligomer, a dendritic acrylate oligomer, or a mixture of two or more thereof.

In this case, the molecular weight of the oligomer is preferably 1000 to 10,000.

Specific examples of the vinyl group-containing monomer or oligomer include divinylbenzene, styrene, and para-methylstyrene.

Meanwhile, according to another embodiment of the present invention, an antimicrobial polymer film comprising a cured product of the antimicrobial polymer coating composition may be provided.

As described above, the antimicrobial polymer film prepared by curing the antimicrobial polymer coating composition is easily applicable to various fields and is suitable for mass production, but can also realize high antimicrobial activity even when applying light in a visible light region, particularly, the generated active oxygen remains for a long time compared to previously known antimicrobial materials, and thus can achieve high antimicrobial efficiency.

The antimicrobial polymer film can be obtained by coating the antimicrobial polymer coating composition onto a predetermined substrate and photo-curing the coated product.

The specific type and thickness of the substrate are not particularly limited, and substrates that are known to be used for the production of a conventional polymer film can be used without particular limitation.

A method and device commonly used for coating the antimicrobial polymer coating composition may be used without particular limitation, and for example, a bar coating method such as Meyer bar method, a gravure coating method, a 2-roll reverse coating method, a vacuum slot die coating method, a 2 roll coating method, etc., may be used.

The coating thickness of the antimicrobial polymer coating composition may be determined according to the use of the antimicrobial polymer film to be finally produced. For example, the antimicrobial polymer coating composition may be coated (applied) in a thickness of 1 μm to 1000 μm.

In the step of photocuring the antimicrobial polymer coating composition, ultraviolet rays or visible rays having a wavelength of 200 to 400 nm can be irradiated, and an exposure amount during irradiation is preferably 50 to 2000 mJ/cm².

The exposure time is also not particularly limited, and can be appropriately changed depending on the exposure device used, the wavelength of the irradiation light, or the exposure amount.

Further, in the step of photocuring the antimicrobial polymer coating composition, nitrogen purging can be carried out to apply nitrogen atmosphere conditions.

Meanwhile, according to another embodiment of the present invention, an antimicrobial polymer film can be provided, comprising: a substrate layer containing a urethane acrylate-based polymer resin having a molar ratio of a urethane functional group to a (meth)acrylate-based functional group of 1 to 10; and a photosensitizer dispersed in the substrate layer, wherein the polymer film has oxygen permeability of 5 to 100 cc/m² day.

As the substrate layer contains a urethane acrylate-based polymer resin having a molar ratio of a urethane functional group to a (meth)acrylate-based functional group of 1 to 10, a predetermined polymer structure may be formed therein, and thereby, the antimicrobial polymer film may have specific air permeability, for example, oxygen permeability, of 5 to 100 cc/m² day, 20 to 90 cc/m² day, or 25 to 80 cc/m² day.

When light in a visible light region is irradiated to such an antimicrobial polymer film, active oxygen species or free radicals are generated from the photosensitizer contained in the substrate layer. As described above, as the antimicrobial polymer film has oxygen permeability in the above-described range, the active oxygen can be generated more efficiently, and also the time during which the active oxygen remains can be greatly increased.

More specifically, the antimicrobial polymer film may have a singlet oxygen lifetime of 0.4 ins or more, 0.8 ms, or 0.10 ms to 0.80 ms, as measured through a time-resolved phosphorescence laser spectroscopy system (see FIG. 2).

Further, the antimicrobial polymer film may have antimicrobial activity of 90% or more, or 90% to 99.9999%, as measured by JIS 81702 (KS L ISO 27447; 2011, fine ceramics—test method for antimicrobial activity of semi-conducting photocatalystic materials).

The antimicrobial polymer film may have a thickness of 10 μm to 10,000 μm.

Meanwhile, when the molar ratio of the urethane functional group to the (meth)acrylate-based functional group in the urethane acrylate-based polymer resin contained in the substrate layer is too small, the oxygen permeability of the antimicrobial polymer film is significantly lowered, and active oxygen is not sufficiently generated during visible light irradiation, and antimicrobial activity is not realized, so that it may be difficult to apply to a plurality of application products.

In addition, when the molar ratio of the urethane functional group to the (meth)acrylate-based functional group in the urethane acrylate-based polymer resin contained in the substrate layer is too large, active oxygen may be generated at a certain level during visible light irradiation, but the film strength of the polymer film is lowered so that a slight amount of the supported photosensitizer may leak out of the film, and a secondary side reaction with the leaked photosensitizer (for example, harmful effects on the human body due to the photosensitizer and environmental pollution, etc.) may occur. In addition, since the polymer film has low hardness, it may be difficult to apply it to a plurality of application products.

Meanwhile, according to another embodiment of the present invention, an electronic product including the above-mentioned antimicrobial polymer film can be provided.

Examples of the electronic product are not particularly limited, and for example, it can be applied to products where harmful bacteria, fungi etc. grow easily, such as a humidifier, a water tank, a refrigerator, an air washer, an aquarium, and an air cleaner.

In order to produce active oxygen or radicals in the antimicrobial polymer film, the electronic product may include a light irradiation device.

In addition, the electronic product may further include a device for distributing the produced active oxygen or radicals, for example, an air circulation device.

Advantageous Effects

According to the present invention, a photocurable antimicrobial coating composition which can maintain high antimicrobial activity for a long period of time even by using light in a visible light region, and that can provide an antimicrobial material suitable for a mass production process, and an antimicrobial coating film which can maintain high antimicrobial activity for a long period of time even by using light in a visible light region, can be provided.

BRIEF DESCRIPTION OF THE DRAWINGS

FIG. 1 shows an IR spectrum of the urethane acrylate-based oligomer prepared in Preparation Example 1.

FIG. 2 schematically shows the method for measuring the production amount and lifetime of singlet oxygen in Experimental Example 2.

FIG. 3 schematically shows a method for measuring the antimicrobial activity of the polymer films of examples and comparative examples according to JIS R 1702 in Experimental Example 3.

DETAILED DESCRIPTION OF THE EMBODIMENTS

Embodiments of the present invention are described in more detail by way of the examples provided below.

However, the following examples are given for illustrative purposes only, and the scope of the present invention is not intended to be limited to or by these examples.

Preparation Example: Preparation of Urethane Acrylate-Based Oligomer (Polymer)

Preparation Example 1

5 g of AOI-VM (M.W. 141.25) from Karenz and 40 g of Desmophen® C1200 (equivalent weight: 1000) from Bayer which is a polyester-carbonate diol were dispersed in 20 g of acetonitrile solution, to which a small amount of DBTDL as a catalyst was added and then reacted at room temperature for 5 hours to prepare a urethane acrylate-based oligomer (polymer).

Then, as shown in FIG. 1, it was confirmed through infrared spectroscopy whether urethane acrylate was produced (the peak increased near 1630 cm$^{-1}$).

Preparation Example 2

5 g of AOI-VM (M.W. 141.25) from Karenz and 40 g of Desmophen® C850 (equivalent weight: 1000) from Bayer which is a polyurethane-carbonate diol were dispersed in 20 g of acetonitrile solution, to which a small amount of DBTDL as a catalyst was added and then reacted at room temperature for 5 hours to prepare a urethane acrylate-based oligomer (polymer).

Preparation Example 3

5 g of AOI-VM (M.W. 141.25) from Karenz and 40 g of Desmophore VPLS2249/1 (Equivalent weight 100) from Bayer which is a polyester-carbonate diol were dispersed in 20 g of an acetonitrile solution, to which a small amount of DBTDL as a catalyst was added and then reacted at room temperature for 5 hours to prepare a urethane acrylate-based oligomer (polymer).

Example: Preparation of Antimicrobial Polymer Coating Composition and Antimicrobial Polymer Film

Example 1

Based on 100 parts by weight of the urethane acrylate-based oligomer of Preparation Example 1 (molar ratio of urethane functional group to acrylate-based functional group of about 1), 1 part by weight of 5,10,15,20-tetrakis(4-methoxyphenyl)-porphine (CAS No. 22112-78-3) as a photosensitizer, 2 parts by weight of a photoinitiator (trade name Darocure TPO), 0.1 parts by weight of a surfactant (trade name: RS90 DIC), 50 parts by weight of toluene, and 50 parts by weight of ethanol were mixed to prepare an antimicrobial polymer coating solution (solid content concentration of 50%).

Then, the antimicrobial polymer coating solution was coated using a #10 bar, and then cured at a rate of 2 m/min using a UV lamp at 0.2 J/cm$^2$ to prepare an antimicrobial polymer film having a thickness of 10 μm.

Example 2

An antimicrobial polymer coating solution (solid content concentration of 50%) and an antimicrobial polymer film (10 μm thick) were prepared in the same manner as in Example 1, except that the urethane acrylate-based oligomer (the molar ratio of the urethane functional group to the acrylate-based functional group of about 4) of Preparation Example 2 was used.

Comparative Example: Preparation of Polymer Film

Comparative Example 1

Based on 100 parts by weight of methyl methacrylate (MMA), 5 parts by weight of trimethylolpropane triacrylate (TMPTA), 1 part by weight of 5,10,15,20-tetrakis(4-methoxyphenyl)-porphine (CAS No. 22112-78-3) as a photosensitizer, 2 parts by weight of a photoinitiator (trade name Darocure TPO), 0.1 parts by weight of a surfactant (trade name RS90 DIC), 50 parts by weight of toluene, and 50 parts by weight of ethanol were mixed to prepare a polymer coating solution (solid content concentration of 50%).

Then, the polymer coating solution was coated using a #10 bar, and then cured at a rate of 2 m/min using a UV lamp at 0.2 J/cm$^2$ to prepare a polymer film having a thickness of 10 μm.

Comparative Example 2

Based on 100 parts by weight of methyl methacrylate (MMA), 5 parts by weight of trimethylolpropane triacrylate (TMPTA), 1 part by weight of 5,10,15,20-tetrakis(4-methoxyphenyl)-21H,23H-porphine cobalt (II) (CAS No. 28903-71-1) as a photosensitizer, 2 parts by weight of a photoinitiator (trade name Darocure TPO), 0.1 parts by weight of a surfactant (trade name: RS90 DIC), 50 parts by weight of toluene, and 50 parts by weight of ethanol were mixed to prepare a polymer coating solution (solid content concentration of 50%).

Then, the polymer coating solution was coated using a #10 bar, and then cured at a rate of 2 m/min using a UV lamp at 0.2 J/cm$^2$ to prepare a polymer film having a thickness of 10 μm.

Comparative Example 3

A polymer coating solution (solid content concentration of 50%) and a polymer film (10 μm thick) were prepared in the same manner as in Example 1, except that the urethane acrylate-based oligomer (the molar ratio of the urethane functional group to the acrylate-based functional group of about 11) of Preparation Example 3 was used.

Experimental Example

Experimental Example 1: Measurement of Oxygen Permeability of Polymer Films of Examples and Comparative Examples The oxygen permeability of the polymer films of the examples and comparative examples was measured at 25° C. under a 60 RH % atmosphere using an Oxygen Permeation Analyzer (Model 8000, Illinois instruments product) according to ASTM D 3895.

Experimental Example 2: Measurement of the Production Amount and Lifetime of Singlet Oxygen of the Polymer Films of Examples and Comparative Examples The production amount and lifetime of singlet oxygen of the polymer films of the examples and comparative examples were measured using a time-resolved phosphorescent laser spectroscopy system shown schematically in FIG. 2.

Specifically, $^1O_2$ (singlet oxygen) exhibits photoluminescence at 1275 nm. Accordingly, the presence/absence of production of $^1O_2$ and the relative amount were measured by using a near infrared photomultiplier tube (NIR-PMT) in a wavelength range of 900 nm to 1400 nm, and the movement of $^1O_2$ was observed through a time-resolved spectrum.

In the case of NIR-PMT, a photoluminescence value in the wavelength region of 900 to 1400 nm could be obtained. Since singlet oxygen exhibited light emission at 1275 nm, in order to optionally detect light emission at 1275 nm, only the light emission (PL) value detected at 1275 nm was obtained by mounting an M/C (monochromator) in front of the PMT.

Experimental Example 3: Measurement of Antimicrobial Activity of Polymer Films of Examples and Comparative Examples The antimicrobial activities of the polymer films of the examples and comparative examples were measured by the method shown schematically in FIG. 3 according to JIS R 1702.

production amount of singlet oxygen as compared with the polymer film of Comparative Example 1, and particularly, the singlet oxygen lifetime was increased by about 20 times, and that the antimicrobial activity was shown as 99% or more.

On the other hand, it was confirmed that in the case of the polymer films prepared in Comparative Examples 1 and 2, not only was the amount of singlet oxygen produced small, but also the singlet oxygen lifetime was extremely short.

In addition, it was confirmed that in the case of the polymer film prepared in Comparative Example 3, the singlet oxygen production amount was large and the singlet oxygen lifetime was long, whereas the polymer film strength was weak and a trace amount of the photosensitizer was melted out by the bacteria-inoculated strains. Therefore, the antimicrobial activity based on the above criteria has not been confirmed.

The invention claimed is:

1. An antimicrobial polymer coating composition comprising: a urethane acrylate-based oligomer or polymer; a photosensitizer; and a photoinitiator, wherein a molar ratio of a urethane functional group to a (meth)acrylate-based functional group in the urethane acrylate-based oligomer or polymer is in the range of 4 to 8, wherein the photosensitizer includes a porphine compound or a porphyrin compound having 1 to 8 phenyl groups having a $C_{1-10}$ alkoxy group, wherein an antimicrobial polymer film formed from the antimicrobial polymer coating composition has a singlet oxygen lifetime of 0.44 ms or more, as measured through a time-resolved phosphorescence laser spectroscopy system, and wherein the antimicrobial polymer coating composition includes a monomer or an oligomer selected from the group consisting of trilene diisocyanate, xylene diisocyanate, trimethylolpropane polyethoxy tri(meth)acrylate, ethylene glycol dimethacrylate, an epoxide acrylate oligomer, an ether acrylate oligomer, a dendritic acrylate oligomer, and a mixture of two or more thereof.

2. The antimicrobial polymer coating composition of claim 1, wherein the urethane acrylate-based oligomer or polymer has a weight average molecular weight ranging from 200 g/mol to 50,000 g/mol.

TABLE 1

| | Molar ratio of urethane functional group to (meth)acrylate-based functional group | Oxygen permeability (cc/m² day) | Singlet oxygen ($^1O_2$) | | |
| | | | Production amount (relative value) | Lifetime (us) | Antimicrobial activity |
|---|---|---|---|---|---|
| Example 1 | 1 | 30 | 3.5 | 400 | 91.2 |
| Example 2 | 4 | 70 | 12.0 | 440 | 99.99 |
| Comparative Example 1 | 0 | 2 | 1 (reference value) | 20 | 81 |
| Comparative Example 2 | 0 | 3 | 0.1 | — | — |
| Comparative Example 3 | 11 | 120 | 9.4 | 360 | — |

As can be seen in Table 1 above, it was confirmed that the polymer films of Examples 1 and 2 prepared using a urethane acrylate-based oligomer having a molar ratio of urethane functional groups to acrylate-based functional groups in the range of 4 to 10 showed a 3.5-times higher 3. The antimicrobial polymer coating composition of claim 1, wherein the photosensitizer has a concentration ranging from 0.01 to 5 parts by weight relative to 100 parts by weight of the urethane acrylate-based oligomer or polymer.

4. An antimicrobial polymer film comprising a cured product of the antimicrobial polymer coating composition of claim 1.

5. An electronic product comprising the antimicrobial polymer film of claim 4.

6. The electronic product of claim 5, wherein the electronic product is a humidifier, a refrigerator, an air washer, or an aquarium.

7. An antimicrobial polymer coating composition comprising: a urethane acrylate-based oligomer or polymer; a photosensitizer; and a photoinitiator, wherein a molar ratio of a urethane functional group to a (meth)acrylate-based functional group in the urethane acrylate-based oligomer or polymer is in the range of 4 to 8, wherein the photosensitizer includes a porphine compound or a porphyrin compound having 1 to 8 phenyl groups having a $C_{1-10}$ alkoxy group, wherein an antimicrobial polymer film formed from the antimicrobial polymer coating composition has a singlet oxygen lifetime of 0.44 ms or more, as measured through a time-resolved phosphorescence laser spectroscopy system, and wherein the antimicrobial polymer coating composition includes a monomer or an oligomer selected from the group consisting of trilene diisocyanate, xylene diisocyanate, a dendritic acrylate oligomer, and a mixture of two or more thereof.

8. The antimicrobial polymer coating composition of claim 7, wherein the urethane acrylate-based oligomer or polymer has a weight average molecular weight ranging from 200 g/mol to 50,000 g/mol.

9. The antimicrobial polymer coating composition of claim 7, wherein the photosensitizer has a concentration ranging from 0.01 to 5 parts by weight relative to 100 parts by weight of the urethane acrylate-based oligomer or polymer.

* * * * *